US008538244B2

(12) United States Patent
Ohwaki

(10) Patent No.: US 8,538,244 B2
(45) Date of Patent: Sep. 17, 2013

(54) RECORDING/REPRODUCTION APPARATUS AND RECORDING/REPRODUCTION METHOD

(75) Inventor: Hiroshi Ohwaki, Minokamo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1550 days.

(21) Appl. No.: 11/408,281

(22) Filed: Apr. 20, 2006

(65) Prior Publication Data

US 2007/0061133 A1    Mar. 15, 2007

(30) Foreign Application Priority Data

May 10, 2005    (JP) .................................. 2005-137894

(51) Int. Cl.
*G11B 27/00*    (2006.01)
(52) U.S. Cl.
USPC ......................................................... 386/285
(58) Field of Classification Search
None
See application file for complete search history.

(56) References Cited

U.S. PATENT DOCUMENTS

| 7,372,504 | B2 | 5/2008 | Fujimura | |
|---|---|---|---|---|
| 2001/0003813 | A1* | 6/2001 | Sugano et al. | 704/500 |
| 2005/0075860 | A1* | 4/2005 | Takeishi et al. | 704/201 |

FOREIGN PATENT DOCUMENTS

| JP | 08-292790 | | 11/1996 |
|---|---|---|---|
| JP | 08-307827 | A | 11/1996 |
| JP | 11/266435 | | 9/1999 |
| JP | 2001-298711 | | 10/2001 |
| JP | 2003-111011 | | 4/2003 |
| JP | 2003-288096 | | 10/2003 |
| JP | 2003-348530 | | 12/2003 |
| JP | 2004-356982 | A | 12/2004 |
| JP | 2004-363924 | A | 12/2004 |
| JP | 2005-101859 | | 4/2005 |
| JP | 2005-117077 | | 4/2005 |

OTHER PUBLICATIONS

Jan. 5, 2010 Japanese Office Action, which is enclosed without an English Translation, that issued in Japanese Patent Application No. 2005-137894.

Digital Voice Processing; Sadahiro Furui; pp. 151-154, Nov. 30, 2006.

Voice Information Processing; Masao Kasuga, Tetsuo Funada, Shinji Hayashi, and Kazuya Takeda; p. 138, pp. 226-230, Nov. 30, 2006.

* cited by examiner

*Primary Examiner* — William C. Vaughn, Jr.
*Assistant Examiner* — Daniel Tekle
(74) *Attorney, Agent, or Firm* — Cowan, Liebowitz & Latman, P.C.

(57)    ABSTRACT

An apparatus for recording and reproducing image data to which audio data is attached includes an extracting unit adapted to extract a specific audio or voice signal from audio data, a recording unit adapted to record the specific audio or voice signal in relation to image data, and a reproducing unit adapted to reproduce the specific audio or voice signal when a reduced image of the image data is selected.

11 Claims, 12 Drawing Sheets

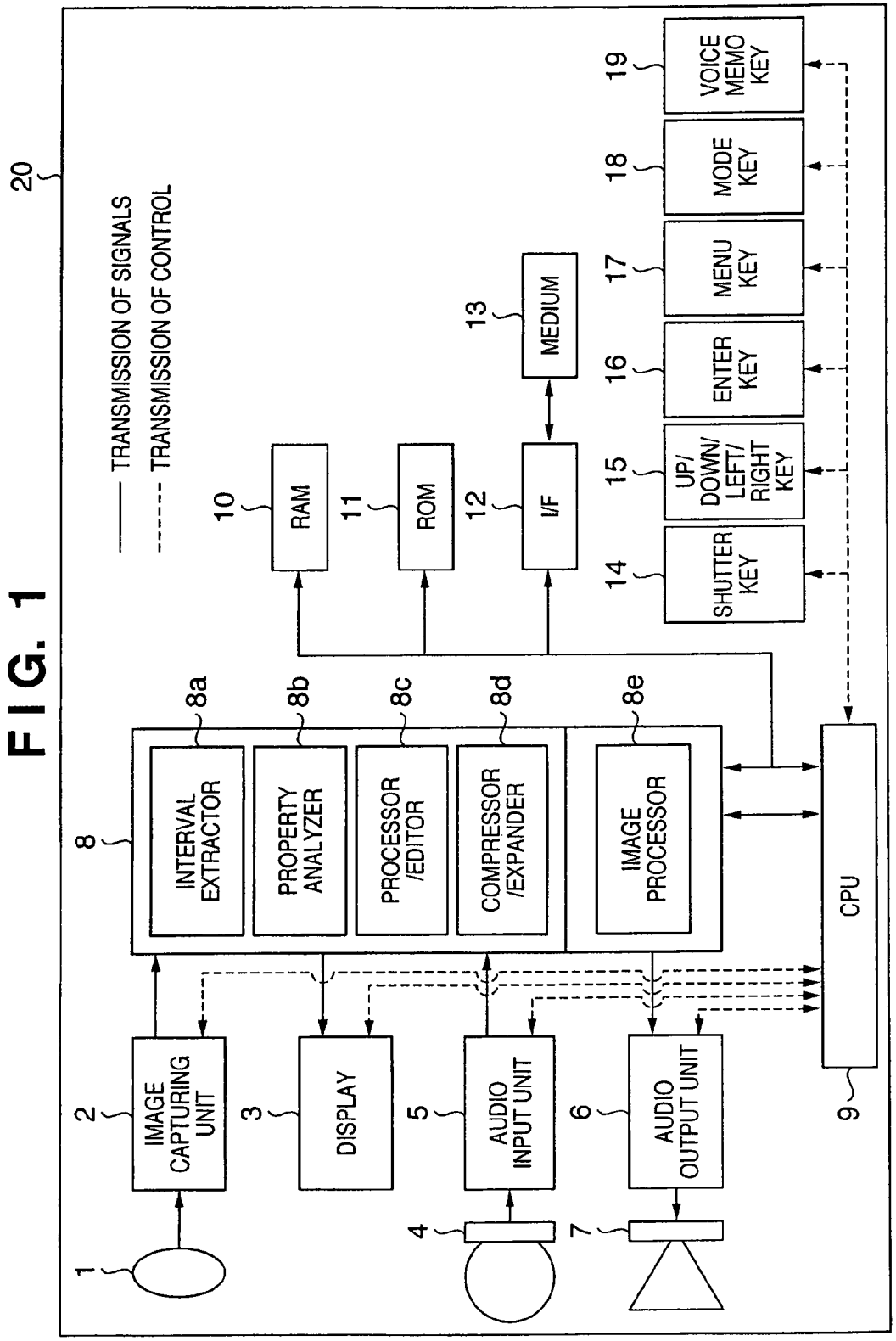

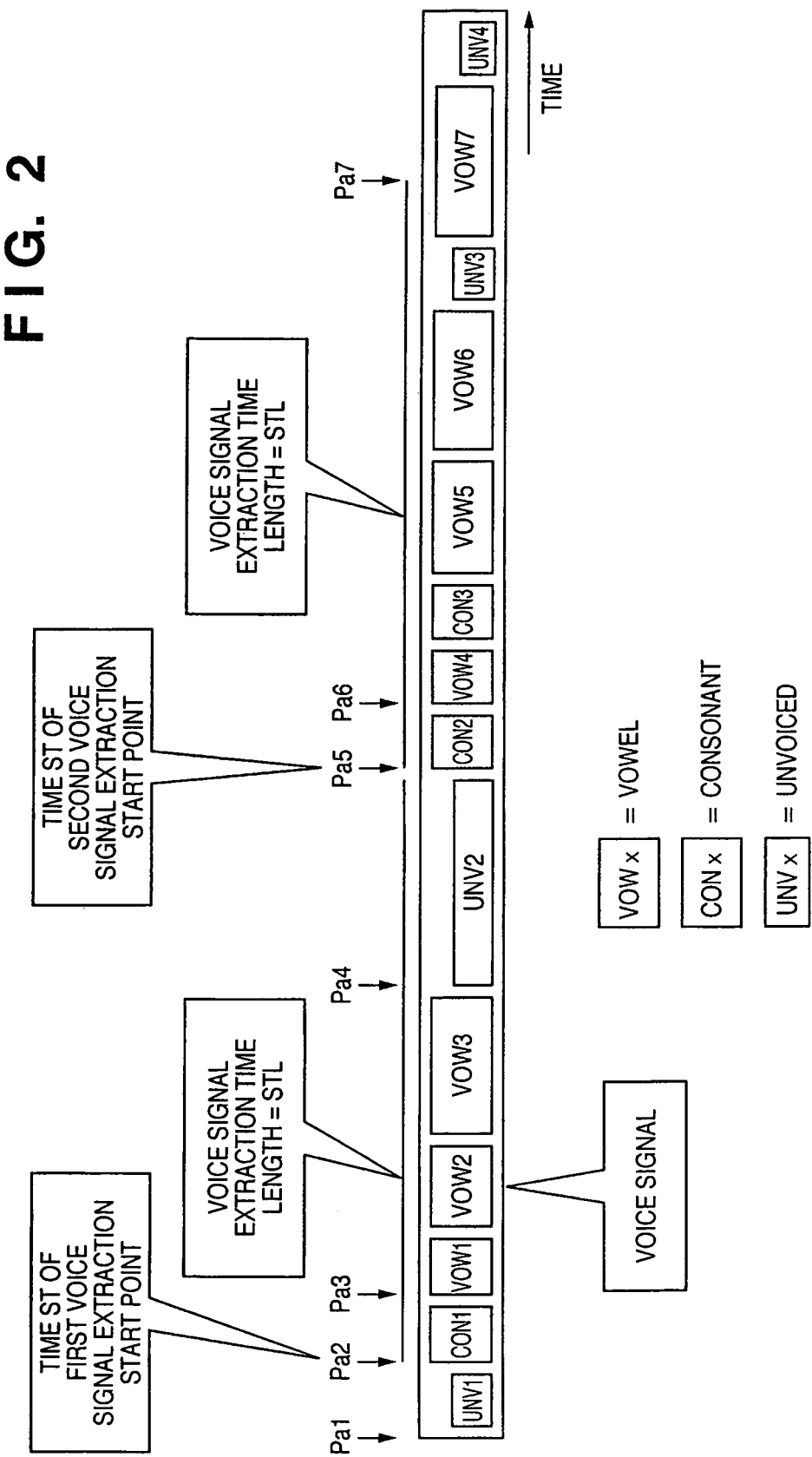

RECORDING/REPRODUCTION APPARATUS AND RECORDING/REPRODUCTION METHOD

FIELD OF THE INVENTION

The present invention relates to a technique which records and reproduces image data to which audio data is attached.

BACKGROUND OF THE INVENTION

A technique which generates a thumbnail image as a representative still image for each of data concerning a still image, motion image, and voice, and manages these thumbnail images in relation to the still image, motion image, and voice is conventionally proposed.

For example, Japanese Patent Laid-Open No. 2003-348530 proposes an apparatus which relates data concerning a still image to data concerning voice.

Also, Japanese Patent Laid-Open No. 2003-111011 proposes a motion image searching apparatus capable of generating a useful representative still image without generating any meaningless frame as a representative still image, as an apparatus for generating a thumbnail image as a better representative still image.

Furthermore, Japanese Patent Laid-Open No. 2001-298711 proposes an apparatus which extracts voice data for a thumbnail image without editing or processing the data.

A basic voice signal processing method is described in Sadahiro Furui, "Digital Voice Processing".

Also, an example of a method of converting the speech rate of a voice signal is described in Masao Kasuga, Tetsuo Funada, Shinji Hayashi, and Kazuya Takeda, "Voice Information Processing".

It is possible by any of the above techniques to manage related data concerning a still image, motion image, and voice by grouping the data, and read out the related data as a data group.

It is also possible to generate a thumbnail image as a more appropriate representative image for related data, and allow a user to recognize the relation of the data group within a short time by looking the thumbnail image.

Unfortunately, although a more appropriate thumbnail image can be generated, no apparatus which generates thumbnail voice as more appropriate representative voice has been proposed.

SUMMARY OF THE INVENTION

The present invention has been made to solve the above problem, and has as its object to provide a technique capable of generating appropriate short-time thumbnail voice.

It is another object of the present invention to provide a technique capable of relating thumbnail voice to a thumbnail image, and reproducing the thumbnail voice when the thumbnail image is selected.

Note that in the present invention, the thumbnail voice described above will be called a "voice thumbnail" hereinafter for the sake of convenience.

To solve the above problem and achieve the objects, there is provided an apparatus for recording and reproducing image data to which audio data is attached, comprising: an extracting unit adapted to extract one of a specific audio signal and a specific voice signal from audio data; and a recording unit adapted to record one of the specific audio signal and the specific voice signal in relation to image data.

Also, there is provided a method of recording and reproducing image data to which audio data is attached, comprising: an extraction step of extracting one of a specific audio signal and a specific voice signal from audio data; and a recording step of recording one of the specific audio signal and the specific voice signal in relation to image data.

The present invention can generate appropriate short-time thumbnail voice. The present invention can also relate thumbnail voice to a thumbnail image, and reproduce the thumbnail voice when the thumbnail image is selected.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 1 is a block diagram of a recording/reproduction apparatus of an embodiment according to the present invention;

FIG. 2 is a schematic view in which vowel intervals, consonant intervals, and unvoiced intervals distributed in a voice signal are temporally arranged;

DETAILED DESCRIPTION OF THE PREFERRED EMBODIMENTS

Figure 3A:
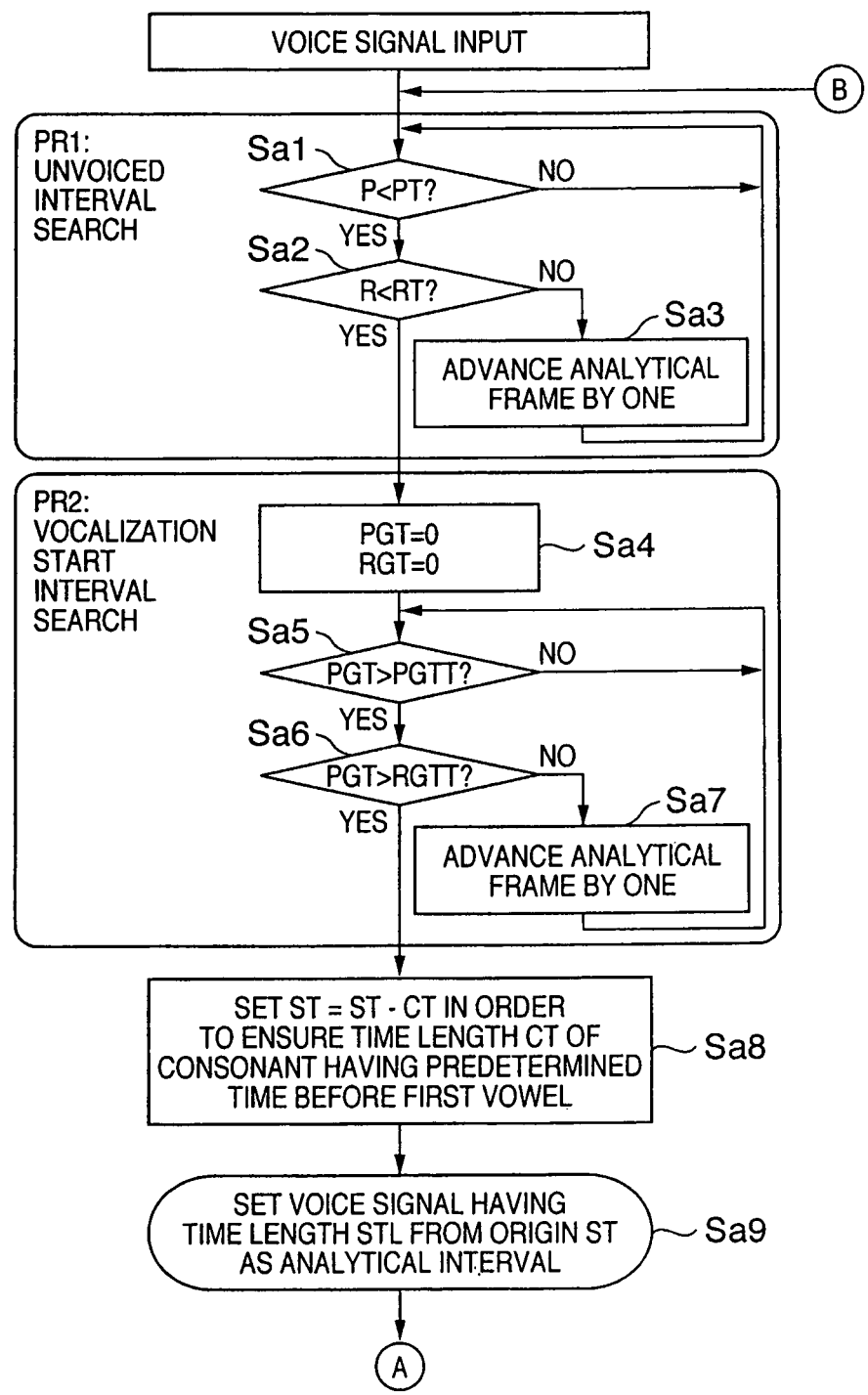
FIGS. 3A and 3B are flowcharts showing the processes of unvoiced interval search, vocalization start search, and check of a vocalization interval ratio in a short-time voice signal interval, performed for a voice signal.

Preferred embodiments of the present invention will now be described in detail in accordance with the accompanying drawings.

Note that the embodiments explained below are examples as means for implementing the present invention. Therefore, the embodiments should be properly corrected or changed in accordance with the arrangement of an apparatus to which the present invention is applied and with various conditions, so the present invention is not limited to the following embodiments.

[Arrangement of Recording/Reproduction Apparatus]

In this embodiment, a recording/reproduction apparatus for image data to which audio data is attached is configured as shown in FIG. 1.

That is, a lens 1 inputs an optical image of an object to be captured. An image capturing unit 2 converts an analog video signal obtained by photoelectrically converting the optical image into a digital video signal. A display 3 displays this digital video signal. A microphone 4 inputs an audio signal as an analog audio signal. An audio input unit 5 converts the analog audio signal into a digital audio signal. A loudspeaker 7 outputs the analog audio signal as audio or voice.

A signal processor 8 comprises an interval extractor 8a which extracts audio and voice signal intervals by processing audio, voice, and image signals, a property analyzer 8b which analyzes the properties of audio and voice signals, a processor/editor 8c which converts the speech rates of audio and voice signals and deletes signals, a compressor/expander 8d which compresses (encodes) and expands (decodes) audio and voice signals, and an image processor 8e which converts an image signal into a luminance/color difference signal, and performs image processing such as compression (encoding) and expansion (decoding).

A CPU 9 controls the whole recording/reproduction apparatus of this embodiment, and relates data. A RAM 10 is used to write and read out image signals, compressed image signals, audio signals, compressed audio signals, programs to be executed by the CPU 9, and data. A ROM 11 is used to record and save programs to be executed by the CPU 9 and data. An interface (I/F) 12 performs signal conversion for writing data in and reading out data from a medium 13. The medium 13 is used to write and read out image signals, compressed image signals, voice signals, and compressed voice signals.

A shutter key 14 designates a shutter release operation. An up/down/left/right key 15 is used to designate an item display on the display 3 by vertical and horizontal movements. An enter key 16 enters an instruction to select an item displayed on the display 3. A menu key 17 designates the start and end of the display of menu items. A mode key 18 switches the state of the apparatus to one of a talking motion image mode, still image mode, and reproduction mode. In the talking motion image mode, a talking motion image is recorded. In the still image mode, a still image is recorded. In the reproduction mode, a talking motion image, still image, still image thumbnail, voice memo, or voice thumbnail recorded in each corresponding mode is reproduced. A still image thumbnail is a simply displayed still image generated from a talking motion image or still image by reducing its size and information amount. A voice memo is a memorandum recorded as voice for a talking motion image or still image. A voice thumbnail is data which is generated by extracting audio or voice signal intervals from audio data and processing and editing the extracted audio or voice signal intervals, and reproducibly recorded in relation to image data. A voice memo key 19 designates the start and stop of recording of memorandum voice for a talking motion image or still image. Reference numeral 20 denotes the entire recording/reproduction apparatus which implements the present invention.

[Voice Thumbnail Formation Method Using Voice Signal]

Figure 3B:
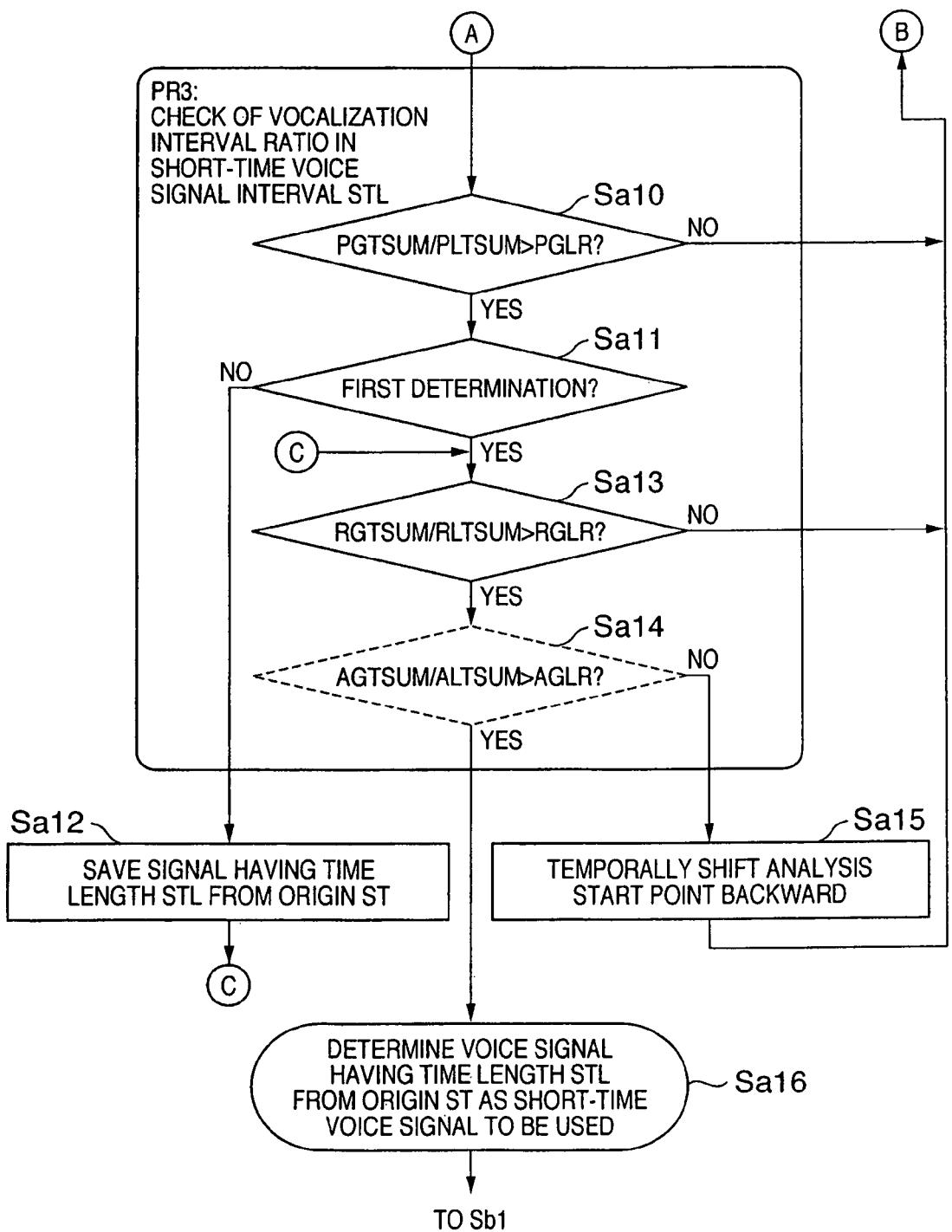
Figure 4:
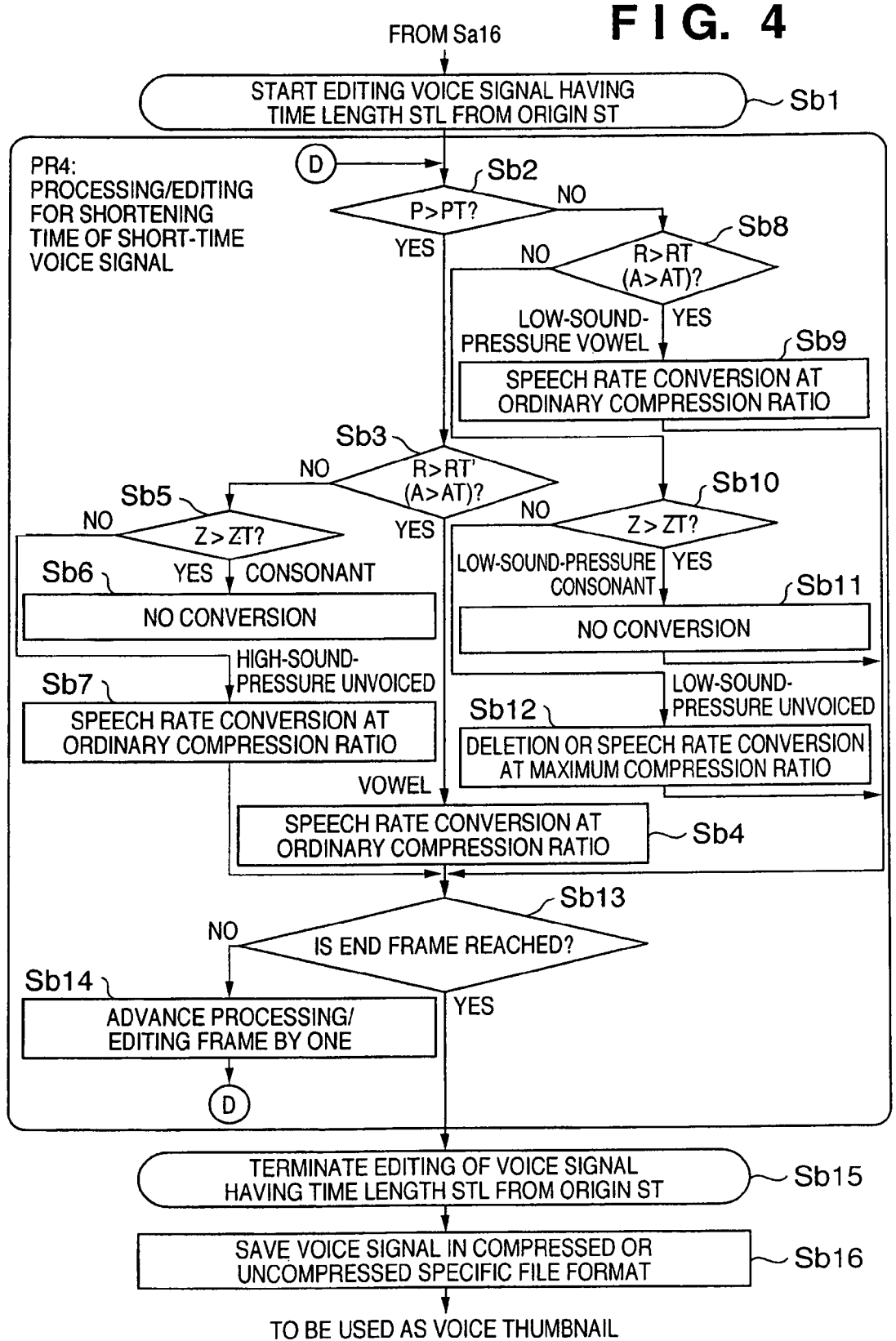
FIG. 4 is a flowchart showing processing/editing 1 for shortening the time of a short-time voice signal.
Figure 5:
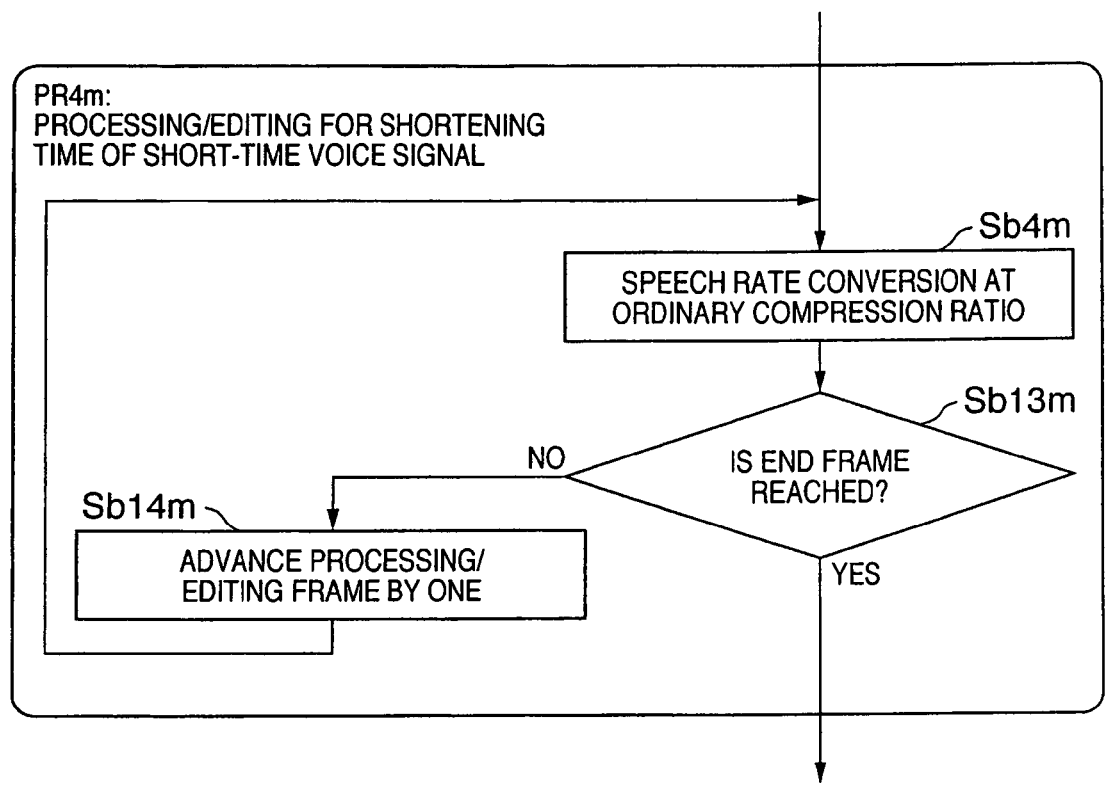
FIG. 5 is a flowchart showing processing/editing 2 for shortening the time of a short-time voice signal.

FIG. 2 is a schematic view in which vowel intervals, consonant intervals, and unvoiced intervals distributed in a voice signal are temporally arranged. Pa1 to Pa7 are pointers which indicate the individual intervals of the voice signal. VOW1 to VOW7 represent vowel intervals; CON1 to CON3, consonant intervals; and UNV1 to UNV4, unvoiced intervals. The time of a voice signal extraction start point is ST, and the voice signal extraction time length is STL. FIGS. 3A and 3B are flowcharts showing the processes of unvoiced interval search, vocalization start search, and check of a vocalization interval ratio in a short-time voice signal interval. FIG. 4 is a flowchart showing processing/editing 1 for shortening the time of a short-time voice signal. FIG. 5 is a flowchart showing processing/editing 2 for shortening the time of a short-time voice signal.

A voice thumbnail formation method using a voice signal according to this embodiment will be explained below.

First, a process of extracting a voice signal existing in audio data by the interval extractor 8a will be explained with reference to FIGS. 1 to 5.

Note that symbols of the basic analytical items of a voice signal are defined as follows.

[Basic Analytical Items of Voice Signal]

Power value=P

Predetermined threshold value of power value P=PT

Continuous time length during which power value P exceeds predetermined threshold value PT=PGT Predetermined threshold value of PGT=PGTT Periodicity value=R Predetermined threshold value of periodicity value R=RT Continuous time length during which periodicity value R exceeds RT=RGT Predetermined threshold value of RGT=RGTT Zero-crossing value=Z Predetermined threshold value of zero-crossing value Z=ZT Power ratio of low frequency to high frequency (lower-frequency power/high-frequency power)=A (the lower frequency is 100 to 900 Hz, the high frequency is 3,700 to 5,000 Hz)

Predetermined threshold value of power ratio A=AT

Total time during which power value P exceeds predetermined threshold value PT from ST as origin=PGTSUM Total time during which power value P is smaller than predetermined threshold value PT from ST as origin=PLTSUM Predetermined threshold value of (PGTSUM/PLTSUM)=PGLR Total time during which periodicity value R exceeds predetermined threshold value RT from ST as origin=RGTSUM Total time during which periodicity value R is smaller than predetermined threshold value RT from ST as origin=RLTSUM Predetermined threshold value of (RGTSUM/RLTSUM)=RGLR Total time during which power ratio A exceeds predetermined threshold value AT from ST as origin=AGTSUM Total time during which power ratio A is smaller than predetermined threshold value AT from ST as origin=ALTSUM Predetermined threshold value of (AGTSUM/ALTSUM)=AGLR Continuous time length of general consonant=CT In addition, for a voice signal to be extracted within a short time in this embodiment, the time ST as an origin and the time length STL are defined as follows.

Time of voice signal extraction start point=ST

Voice signal extraction time length=STL

An outline of the processing performed by the signal processor 8 will be described below.

First, if a voice signal in audio data is compressed, this voice signal is expanded and converted into a waveform digital value of the voice signal. If the voice signal in the audio data is not compressed, a waveform digital value of the voice signal is extracted without expanding the signal. An analytical point of the voice signal is set at the beginning of the waveform digital value of the voice signal, and a vocalization signal interval is extracted from this analytical point.

More specifically, an unvoiced interval is searched for first, and then a vocalization start point after this unvoiced interval is searched for. This point is set as the time ST of a voice signal extraction start point. Subsequently, if a vocalization interval ratio is higher than a predetermined ratio in a voice signal having the voice signal extraction time length STL from ST, this voice signal having the length STL is extracted as a vocalization signal interval.

After that, this vocalization signal interval undergoes speech rate conversion and signal deletion by which the signal interval is divided in accordance with the properties of voice and the divided intervals are temporally compressed, thereby compressing the signal time and increasing the voice information amount per unit time. This voice signal having the increased voice information amount is converted into a compressed or uncompressed specific file format, and saved in the medium 13 in relation to image data. In this manner, the file is used as a voice thumbnail.

The above processing will be explained below with reference to FIGS. 1 to 3B.

First, if a voice signal in audio data is compressed, this voice signal is expanded and converted into a waveform digital value of the voice signal by the compressor/expander 8d for audio and voice signals. If the voice signal in the audio data is not compressed, a waveform digital value is extracted without expanding the voice signal.

After that, an analytical point of the voice signal is set at the point Pa1 at the beginning of the waveform digital value of the voice signal, and the interval extractor 8a starts unvoiced interval search PR1. In PR1, while an analytical frame is advanced forward in Sa3, whether the power value P is smaller than the predetermined threshold value PT is determined in Sa1, and whether the periodicity value R is smaller than the predetermined threshold value RT is determined in Sa2.

If YES in both Sa1 and Sa2, it is determined that an unvoiced interval is found, and the interval extractor 8a starts vocalization start search PR2. In Sa4 of PR2, the continuous time length PGT during which the power value exceeds the predetermined threshold value and the continuous time length RGT during which the periodicity value exceeds the predetermined threshold value are initialized to zero. Subsequently, while the analytical frame is advanced forward in Sa7, whether PGT exceeds the predetermined threshold value PGTT is determined in Sa5, and whether RGT exceeds the predetermined threshold value RGTT is determined in Sa6.

If YES in both Sa5 and Sa6, it is determined that the vocalization start is found, so this vocalization start point is set as the time ST of the voice signal extraction start point, and the analytical point advances to Pa3. To prevent a consonant at the beginning of vocalization from being removed from the beginning of the voice signal extraction time length STL, the time ST (=Pa3) of the voice signal extraction start point is shifted forward by CT so that ST=ST−CT (=Pa2) in Sa8. In this step, the analytical point of the voice signal advances to Pa2.

In Sa9, a voice signal having the voice signal extraction time length STL from the time ST (=Pa2) of the voice signal extraction start point is set as an analytical interval. Then, the interval extractor 8a starts check PR3 of a vocalization interval ratio in the short-time voice signal interval STL. In Sa10 of PR3, it is determined whether the signal time ratio at which the audio signal power exceeds the predetermined threshold value from the time ST of the voice signal extraction start point as an origin is higher than the predetermined ratio, i.e., whether the value of (PGTSUM/PLTSUM) exceeds the predetermined threshold value PGLR.

If it is determined in Sa11 that this is the first determination, a signal having the time length STL from ST as an origin is saved in Sa12. If it is found later that no voice exists in all analytical signal intervals, a voice thumbnail is formed by using the voice signal having the time length STL from ST as an origin.

In Sa13, it is determined whether the signal time ratio at which the audio signal periodicity value exceeds the predetermined threshold value from the time ST of the voice signal extraction start point as an origin is higher than the predetermined ratio, i.e., whether the value of (RGTSUM/RLTSUM) exceeds the predetermined threshold value RGLR.

In Sa14, although it is not always necessary to execute this step, it is determined whether the signal time ratio at which the power ratio of the low frequency to the high frequency of the voice signal exceeds the predetermined threshold value is higher than the predetermined ratio, i.e., whether the value of (AGTSUM/ALTSUM) exceeds the predetermined threshold value AGLR.

If YES in Sa10 and Sa13, and if Sa14 is executed and the result is YES, the flow advances to Sa16, and the voice signal having the time length STL from ST (=Pa2) as an origin is determined as a short-time voice signal to be used as a vocalization signal interval.

If NO in any of Sa10, Sa13, and Sa14, the flow advances to Sa15 to temporally shift the analytical point backward to Pa3, and reexecute PR1, PR2, and PR3. In this manner, a voice signal having the voice signal extraction time length STL from the time ST (=Pa5) of the voice signal extraction start point can be determined as a short-time voice signal to be used as a vocalization signal interval.

Figure 6:
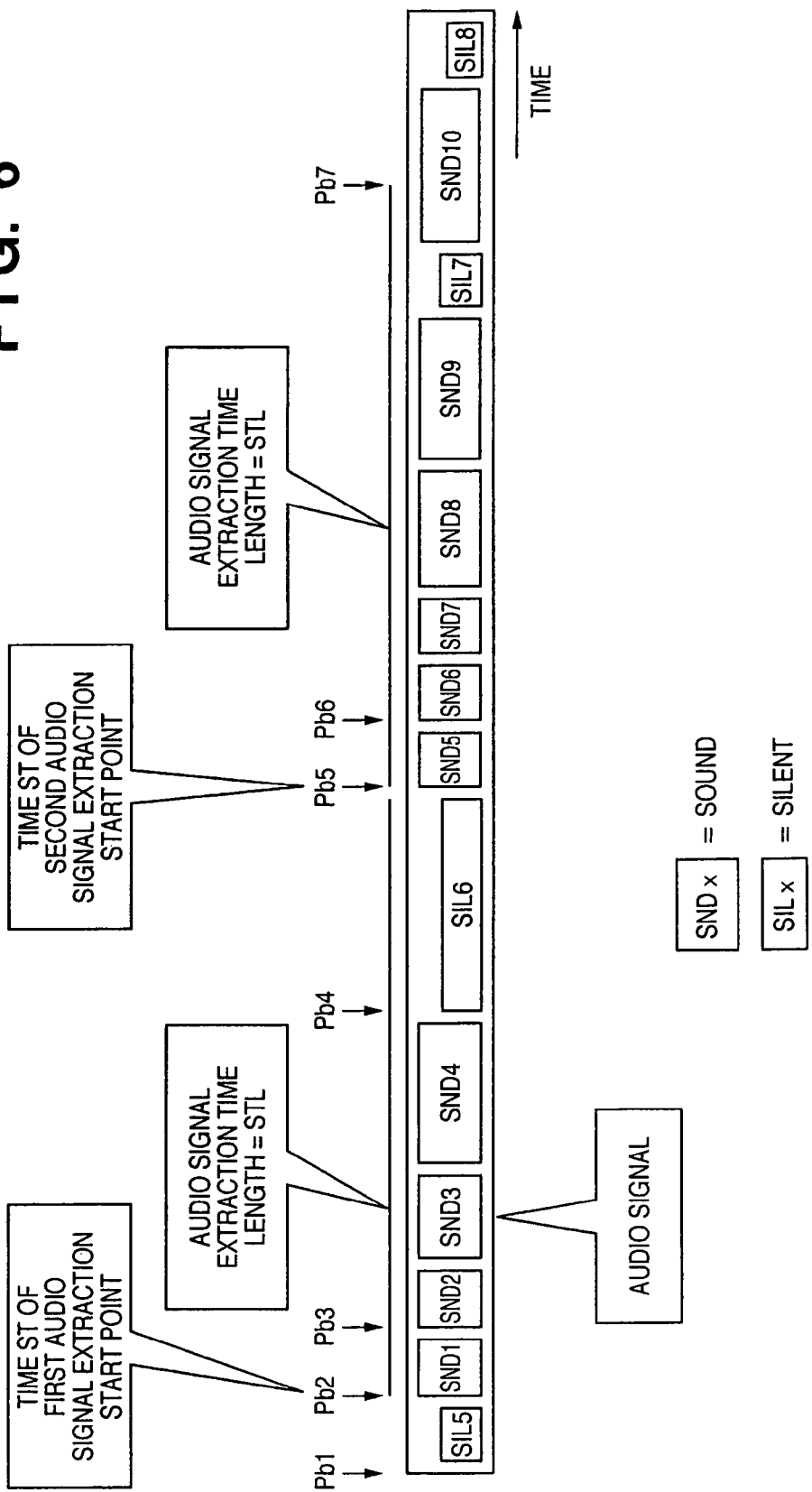
FIG. 6 is a schematic view in which sound intervals and silent intervals distributed in an audio signal are temporally arranged.
Figure 7:
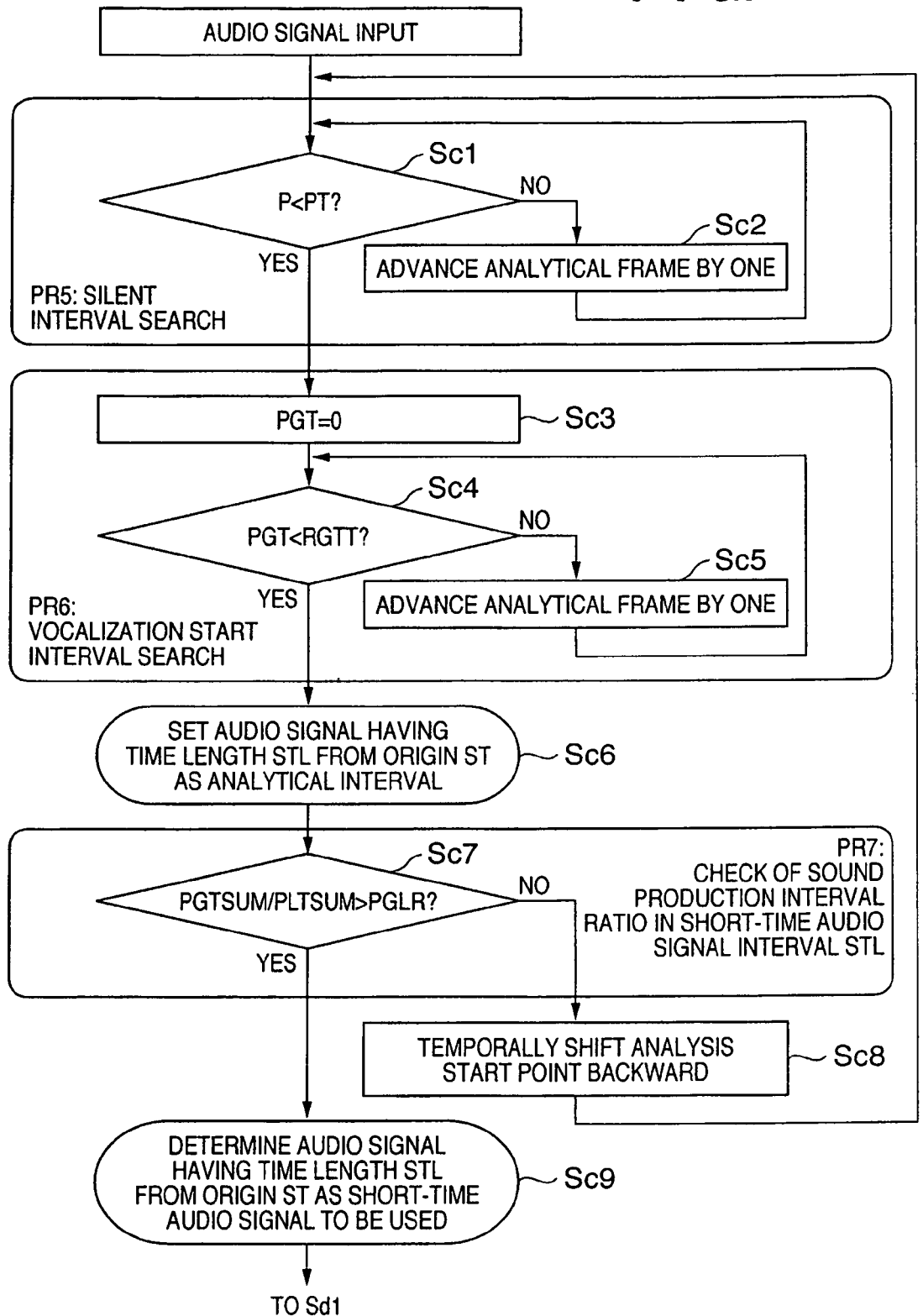
FIG. 7 is a flowchart showing the processes of silent interval search, sound production start search, and check of a sound production interval ratio in a short-time audio signal interval, performed for an audio signal.

Also, if in Sa15 the analytical point goes beyond the trailing end of the voice signal after being repetitively shifted temporally backward, it is determined that no voice signal exists. If no voice signal exists in the audio data extracted by the interval extractor 8a, a process of searching for and extracting a sound production signal interval to be described later with reference to FIGS. 6 and 7 is started. This means that silent interval search PR5 in FIG. 7 is started by setting the analytical point of an audio signal in the audio data at a point Pb1 in FIG. 6 which is the beginning of the audio signal.

If the processing advances to Sa16 and the short-time voice signal to be used as a vocalization signal interval is determined, the flow advances to Sa1 in FIG. 4 to start editing the voice signal having the time length STL from ST as an origin.

In PR4, the property analyzer 8b and processor/editor 8c perform processing/editing for shortening the time of the voice signal having the time length STL from ST as an origin. In Sa13, whether the end frame is reached is determined. In Sa14, the voice signal is edited and processed while a processing/editing frame is advanced one at a time.

In Sb2, whether the power value P exceeds the predetermined threshold value PT is determined.

In Sb3 and Sb8, whether the periodicity value R exceeds the predetermined threshold value RT is determined. In Sb3 and Sb8, it is also possible to simultaneously determine whether the periodicity value R exceeds the predetermined threshold value RT, and whether the power ratio A of the low frequency to the high frequency exceeds the predetermined threshold value AT.

In Sb5 and Sa10, whether the zero-crossing value Z exceeds the predetermined threshold value ZT is determined.

In Sb4, it is determined that the interval is a vowel interval, so the signal time is shortened by speech rate conversion at an ordinary compression ratio.

In Sb6, it is determined that the interval is a consonant interval, so no conversion is performed.

In Sb7, it is determined that the interval is an unvoiced interval having a high sound pressure, so the signal time is shortened by speech rate conversion at an ordinary compression ratio.

In Sb9, it is determined that the interval is a vowel interval having a low sound pressure, so the signal time is shortened by speech rate conversion at an ordinary compression ratio.

In Sa11, it is determined that the interval is a consonant interval having a low sound pressure, so no conversion is performed.

In Sa12, it is determined that the interval is an unvoiced interval having a low sound pressure, so the signal is deleted or the signal time is shortened by speech rate conversion at a maximum compression ratio.

If the end frame is reached in Sa13, PR4 is terminated. In Sa15, the editing of the voice signal having the time length STL from ST (=Pa2 or Pa5 in FIG. 2) as an origin is terminated, thereby obtaining the edited short-time voice signal. In Sa16, the compressor/expander 8d converts this edited short-time voice signal into a compressed or uncompressed specific file format, and the file is saved in relation to image data. In this manner, the file is used as a voice thumbnail.

The contents of PR4 which performs processing/editing for shortening the time of the voice signal may also be changed to PR4m shown in FIG. 5, thereby performing speech rate conversion at an ordinary compression ratio on voice signals of all frames. In this case, while whether the end frame is reached is determined in Sa13m, the editing/processing frame is advanced one at a time in Sa14m, and the signal time is shortened by speech rate conversion at an ordinary compression ratio in Sb4m. If the end frame is reached in Sa13m, PR4m is terminated, and the editing of the voice signal having the time length STL from ST (=Pa2 or Pa5 in FIG. 2) as an origin is terminated in Sa15, thereby obtaining the edited short-time voice signal. In Sa16, the compressor/expander 8d converts this edited short-time voice signal into a compressed or uncompressed specific file format, and the file is saved in relation to image data. This file is used as a voice thumbnail.

After that, the interval extractor 8a performs the processes described above with reference to FIGS. 1 to 5. If the analysis start point shown in FIG. 3B goes beyond the trailing end of the audio data used to extract a voice thumbnail by repeating Sa15 in which this point is temporally shifted backward, it is determined that no voice exists in the audio data, so audio other than voice is extracted.

[Voice Thumbnail Formation Method Using Audio Signal]

The method of forming a voice thumbnail by using audio other than voice will be explained below with reference to FIGS. 1 and 6 to 9.

Figure 8:
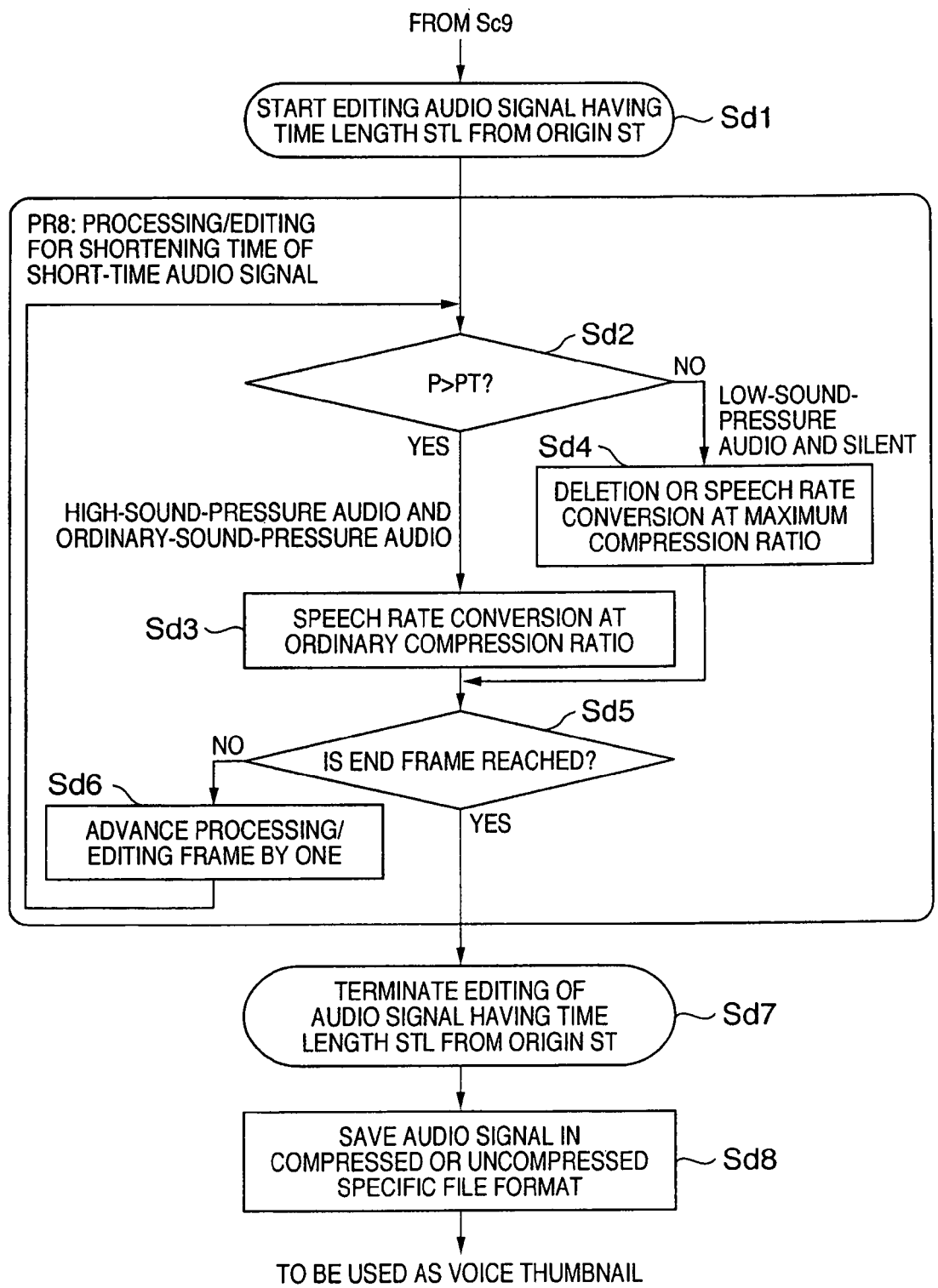
FIG. 8 is a flowchart showing processing/editing 1 for shortening the time of a short-time audio signal.
Figure 9:
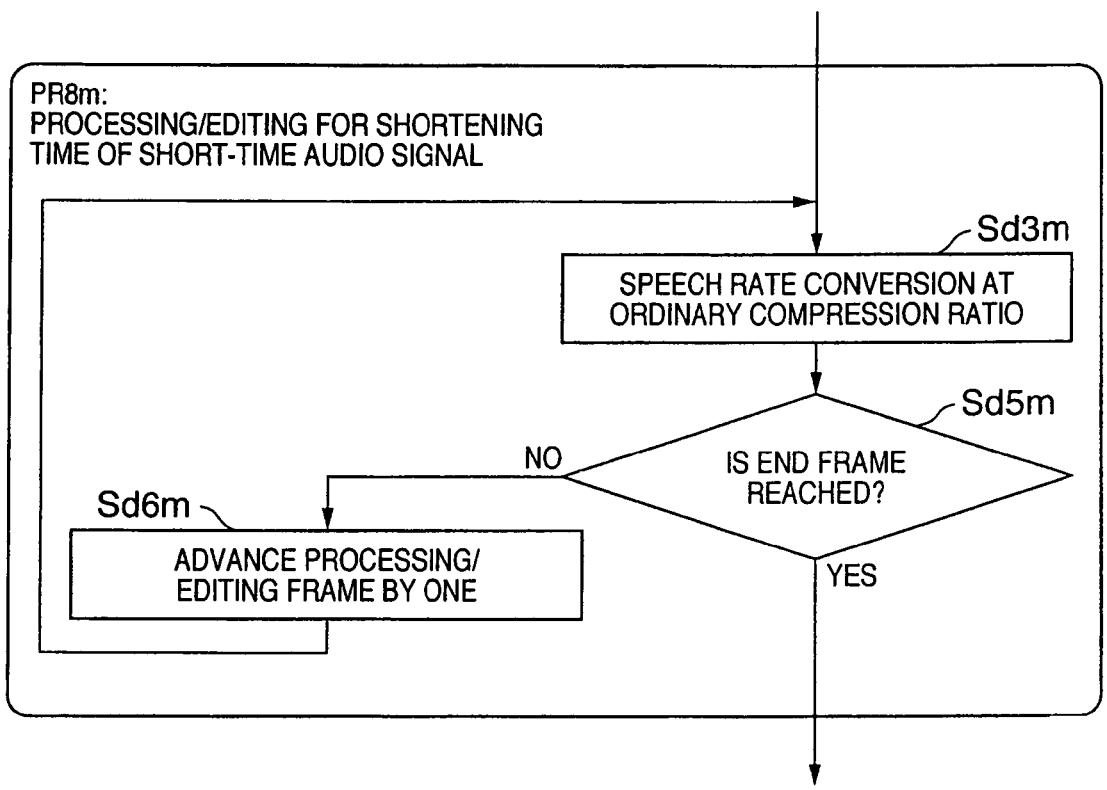
FIG. 9 is a flowchart showing processing/editing 2 for shortening the time of a short-time audio signal.

FIG. 6 is a schematic view in which sound intervals and silent intervals distributed in an audio signal are temporally arranged. In FIG. 6, Pb1 to Pb7 are pointers which indicate intervals containing audio signals. SND1 to SND10 represent sound intervals, and SIL5 to SIL8 represent silent intervals. The time of an audio signal extraction start point is ST, and the audio signal extraction time length is STL. FIG. 7 is a flowchart showing the processes of silent interval search, sound production start search, and check of a sound production interval ratio in a short-time audio signal interval. FIG. 8 is a flowchart showing processing/editing 1 for shortening the time of a short-time audio signal. FIG. 9 is a flowchart showing processing/editing 2 for shortening the time of a short-time audio signal.

First, an outline of the processing performed by the signal processor 8 will be explained.

If an audio signal having the audio signal extraction time length STL is initially saved in Sa12 of FIG. 3B described above, this audio signal is used to perform processing A described below. If no audio signal having the audio signal extraction time length STL is saved in Sa12 of FIG. 3B, and if an audio signal in audio data is initially compressed, this audio signal is expanded and converted into a waveform digital value of the audio signal. If the audio signal is not compressed, a waveform digital value of the audio signal is extracted without any conversion.

Then, an analytical point of the audio signal is determined at the beginning of the waveform digital value of the audio signal, and a sound production signal interval is extracted while the analytical point is advanced. That is, a silent interval is searched for first, and then a sound production start point after that is searched for, and the found point is set as the time ST of the audio signal extraction start point. Also, if a sound production interval ratio is higher than a predetermined ratio in an audio signal having the audio signal extraction time length STL from ST, this audio signal having the length STL is extracted as a sound production signal interval.

Subsequently, in processing A described above, this sound production signal interval undergoes speech rate conversion and signal deletion by which the signal interval is divided in accordance with the properties of audio and the divided intervals are temporally compressed, thereby compressing the signal time and increasing the audio information amount per unit time. This audio signal having the increased audio information amount is converted into a compressed or uncompressed specific file format, and saved in the medium 13 in relation to image data. In this manner, the file is used as a voice thumbnail.

The above processing will be explained below with reference to FIGS. 1, 6, and 7.

First, if an audio signal having the audio signal extraction time length STL is saved in Sa12 of FIG. 3B described above, this audio signal is used to perform processes from processing/editing for shortening the time of a short-time audio signal in PR8 of FIG. 8. If no audio signal having the audio signal extraction time length STL is saved in Sa12 of FIG. 3B, and if an audio signal in audio data is initially compressed, this audio signal is expanded and converted into a waveform digital value of the audio signal by the compressor/expander 8d. If the audio signal is not compressed, a waveform digital value of the audio signal is extracted without any conversion. An analytical point of the audio signal is set at the beginning of the waveform digital value of the audio signal, and a sound production signal interval is extracted while the analytical point is advanced.

In this case, the analytical point of the audio signal is set at Pb1, and the interval extractor 8a starts silent interval search PR5. In PR5, while an analytical frame is advanced forward in Sc2, whether the power value P is smaller than the predetermined threshold value PT is determined in Sc1. If YES in Sc1, it is determined that a silent interval is found, and the interval extractor 8a starts sound production start search PR6.

In Sc3 of PR6, the continuous time length PGT during which the power value exceeds the predetermined threshold value is initialized to zero. While the analytical frame is advanced in Sc5, whether the continuous time length PGT during which the power value exceeds the predetermined threshold value exceeds the predetermined threshold value PGTT is determined in Sc4. If YES in Sc4, it is determined that a sound production start interval is found.

In Sc6, an audio signal having the audio signal extraction time length STL from the time ST (=Pb2) of the audio signal extraction start point is set as an analytical interval. Then, the interval extractor 8a starts check PR7 of a sound production interval ratio in the short-time audio signal interval STL. In Sc7 of PR7, whether the value of (PGTSUM/PLTSUM) exceeds the predetermined threshold value PGLR is determined.

If Yes in Sc7, the flow advances to Sc9, and the audio signal having the time length STL from ST (=Pb2) as an origin is determined as a short-time audio signal to be used as a sound production signal interval. If NO in Sc7, the analytical point is temporally shifted backward to Pb3 in Sc8, and PR5, PR6, and PR7 are reexecuted. In this way, an audio signal having the audio signal extraction time length STL from the time ST (=Pb5) of the audio signal extraction start point can be determined as a short-time audio signal to be used as a sound production signal interval.

In Sd1 of FIG. 8, editing of the audio signal having the time length STL from ST as an origin is started. In PR8, the property analyzer 8b and processor/editor 8c perform processing/editing for shortening the time of the short-time audio signal.

In Sd5, whether the end frame is reached is determined. In Sd6, the audio signal is edited and processed while the processing/editing frame is advanced one at a time. In Sd2, whether the power value P exceeds the predetermined threshold value PT is determined. In Sd3, it is determined that the interval is a high-sound-pressure audio interval or ordinary-sound-pressure audio interval, so the signal time is shortened by speech rate conversion at an ordinary compression ratio. In Sd4, it is determined that the interval is a low-sound-pressure audio interval or silent interval, so the signal is deleted or the signal time is shortened by speech rate conversion at a maximum compression ratio. If the end frame is reached in Sd5, PR8 is terminated. In Sd7, the editing of the audio signal having the time length STL from ST (=Pb2 or Pb5 in FIG. 6) as an origin is terminated, thereby obtaining the edited short-time audio signal. In Sd8, the compressor/expander 8d converts this edited short-time audio signal into a compressed or uncompressed specific file format, and the file is saved in relation to image data. This file is used as a voice thumbnail.

It is also possible to change the processing in PR8 to PR8m shown in FIG. 9, thereby performing speech rate conversion at an ordinary compression ratio on audio signals of all frames. In this case, while whether the end frame is reached is determined in Sd5m, the editing/processing frame is advanced one at a time in Sd6m, and the signal time is shortened by speech rate conversion at an ordinary compression ratio in Sd3m. If the end frame is reached in Sd5m, PR8m is terminated, and the editing of the audio signal having the time length STL from ST (=Pb2 or Pb5 in FIG. 6) as an origin is terminated in Sd7, thereby obtaining the edited short-time audio signal. In Sd8, the compressor/expander 8d converts this edited short-time audio signal into a compressed or uncompressed specific file format, and the file is saved in relation to image data. This file is used as a voice thumbnail.

A voice thumbnail recording operation of this embodiment will be explained below by taking as an example a case in which a voice thumbnail is extracted from a voice portion of a talking motion image currently being captured.

Referring to FIG. 1, the talking motion image mode is first selected by the mode key 18 to form a talking motion image, form a still image thumbnail attached to the talking motion image, and form a voice thumbnail from an audio signal of a voice portion of the talking motion image, while the talking motion image is being captured. The talking motion image, the still image thumbnail attached to the talking motion image, and the voice thumbnail are converted into a specific file format, and the file is recorded on the medium 13. If the talking motion image, the still image thumbnail attached to the talking motion image, and the voice thumbnail are to be compressed, they are compressed by the image processor 8e or compressor/expander 8d, and recorded on the medium 13 via the interface (I/F) 12. The recorded voice thumbnail is used as a voice thumbnail in relation to the image data.

In the voice thumbnail recording operation described above, a voice thumbnail may also be extracted, after a talking motion image is captured, from a voice portion of the recorded talking motion image.

In the voice thumbnail recording operation described above, it is also possible to extract a voice thumbnail from a voice memo signal while a voice memo is being recorded.

In the voice thumbnail recording operation described above, a voice thumbnail may also be extracted, after a voice memo is recorded, from the recorded voice memo.

[Voice Thumbnail Recording/Reproducing Operation]

A voice thumbnail recording/reproducing operation of this embodiment will be explained below with reference to FIGS. 10 and 11.

Figure 10:
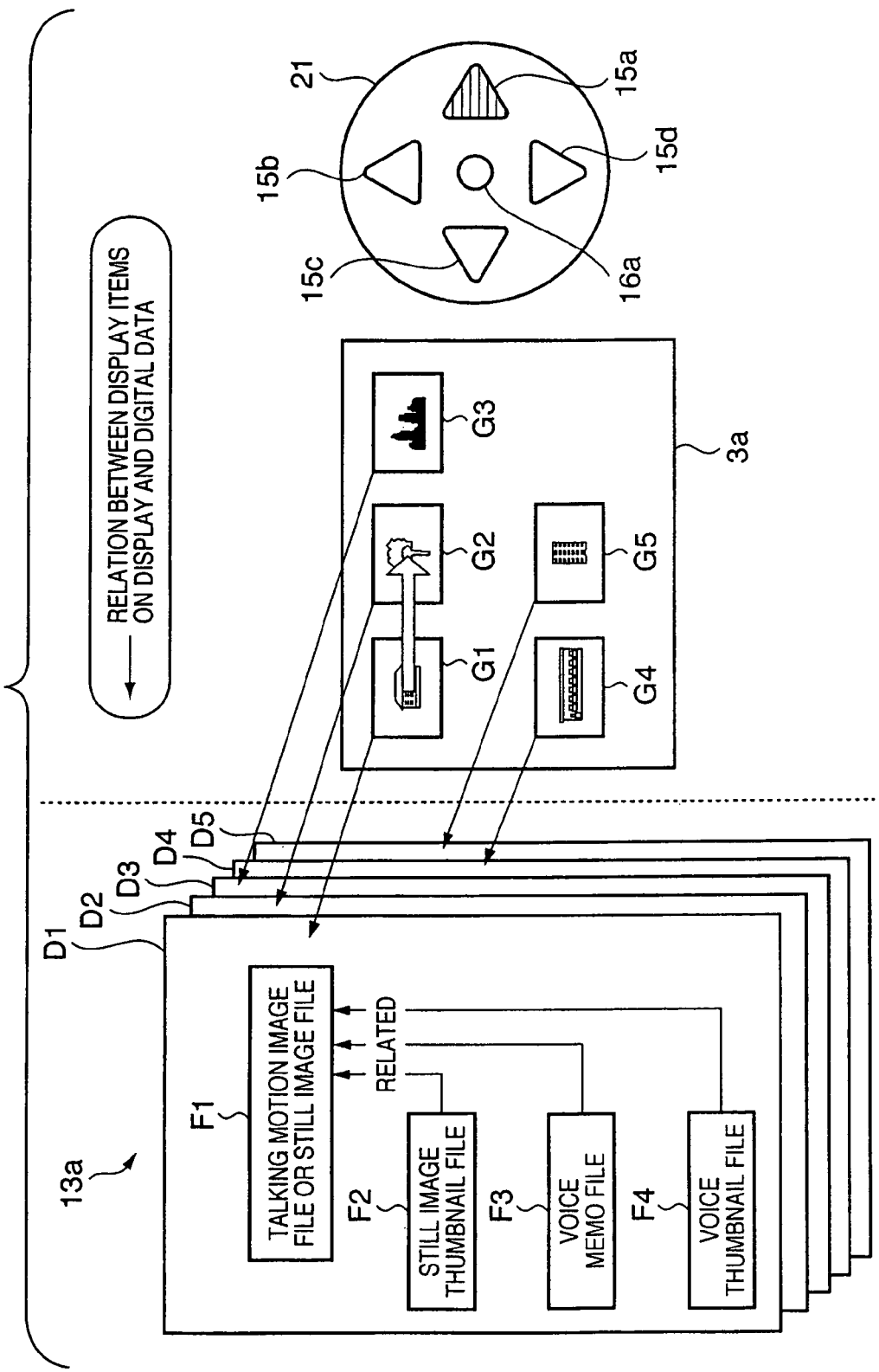
FIG. 10 is a block diagram for explaining an operation of recording a voice thumbnail in relation to a talking motion image file or still image file.

Note that a medium 13a in FIG. 10 corresponds to the medium 13 in FIG. 1, a display 3a in FIG. 10 corresponds to the display 3 in FIG. 1, an up/down/left/right key & enter key 21 in FIG. 10 corresponds to the up/down/left/right key 15 and enter key 16 in FIG. 1, and 15b, 15d, 15c, and 15a in FIG. 10 respectively correspond to the up key, down key, left key, and right key of the up/down/left/right key 15 in FIG. 1.

Also, 16a in FIG. 10 corresponds to the enter key 16 in FIG. 1. Image thumbnail display items G1, G2, G3, G4, and G5 on the display 3a are respectively related to data D1, D2, D3, D4, and D5 in the medium 13a. D1 contains a talking motion image file or still image file F1, still image thumbnail file F2, voice memo file F3, and voice thumbnail file F4. The voice memo file F3 does not exist if the user did not record it. The contents of the voice thumbnail file F4 can be extracted from a voice portion of the talking motion image file F1 or from the voice memo file F3. The files F1, F2, F3, and F4 may also be grouped into one file or divided into several files. Each of the data D2, D3, D4, and D5 also contains a talking motion image file or still image file, still image thumbnail file, voice memo file, and voice thumbnail file.

Figure 11:
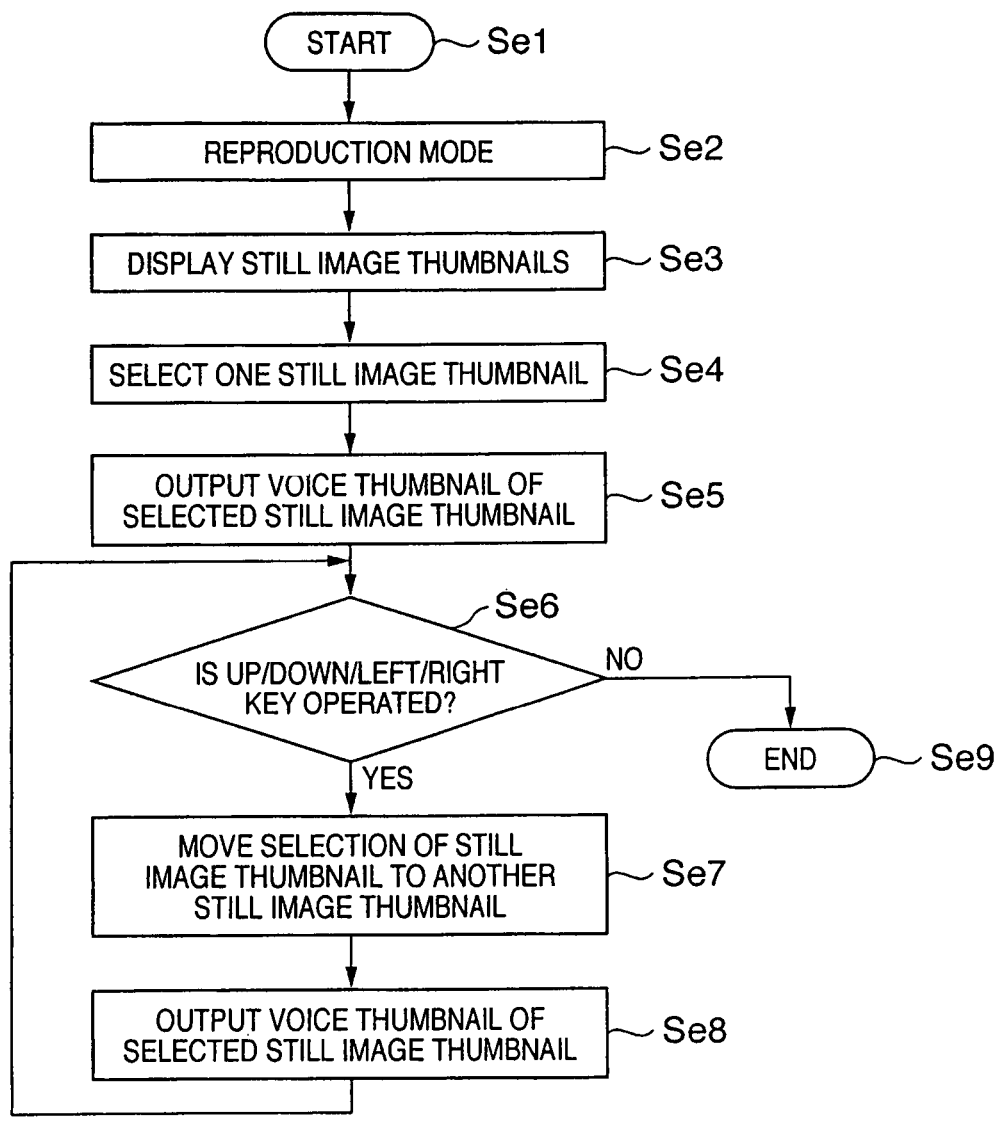
FIG. 11 is a flowchart showing a voice thumbnail reproducing operation.

Referring to FIG. 11, the operation is started in Se1. If the user sets the mode key 18 to, e.g., the reproduction mode in Se2, the CPU 9 operates the recording/reproduction apparatus 20 in the reproduction mode. In Se3, the display 3a displays the still image thumbnails G1, G2, G3, G4, and G5 respectively related to the data D1, D2, D3, D4, and D5 recorded on the medium 13a.

In Se4, the data D1 and the representative still image thumbnail G1 are selected, and a selection display frame is displayed around G1.

In Se5, the audio signal of the voice thumbnail file F4 in the selected data D1 in the medium 13a is converted into an analog audio signal by the audio output unit 6 via the interface (I/F) 12 and signal processor 8, and output as audio or voice from the loudspeaker 7. If the audio signal is compressed, it is expanded by the compressor/expander 8d of the signal processor 8.

If a key other than the up key 15b, down key 15d, left key 15c, and right key 15a is operated in Se6, the voice thumbnail output is terminated in Se9. If the enter key 16a is operated instead of the up, down, left, and right keys, no voice thumbnail is output, and image data and audio data attached to the image data are directly output.

If the up key 15b, down key 15d, left key 15c, or right key 15a is operated in Se6, the selection of the still image thumbnail moves to another still image thumbnail.

In Se8, an audio signal of a voice thumbnail file in the data selected immediately after the movement is converted into analog audio signal by the audio output unit 6 via the interface (I/F) 12 and signal processor 8, and output as audio or voice from the loudspeaker 7. If the audio signal is compressed, it is expanded by the compressor/expander 8d of the signal processor 8. After that, the flow returns to Se6 to repeat the processing.

[Other Embodiments]

Although the embodiment of the present invention is described in detail above, the present invention can take the forms of embodiments such as a system, apparatus, method, program, or storage medium (recording medium). More specifically, the present invention is applicable to a system comprising a plurality of apparatuses or to an apparatus comprising a single device.

Note that the present invention can also be achieved by supplying the program (corresponding to the flowcharts shown in the individual drawings of the embodiments described above) of software for implementing the functions of the embodiment to a system or apparatus directly or from a remote place, and allowing a computer of the system or apparatus to read out and execute the supplied program code.

Accordingly, the program code itself installed in the computer to implement the functional processing of the present invention by the computer also implements the present invention. That is, the present invention includes the computer program itself for implementing the functional processing of the present invention.

In this case, the program can take the form of, e.g., an object code, a program executed by an interpreter, or script data to be supplied to an OS, as long as the program has a program function.

Examples of the recording medium (storage medium) for supplying the program are a floppy (registered trademark) disk, hard disk, optical disk, magnetooptical disk, MO, CD-ROM, CD-R, CD-RW, magnetic tape, nonvolatile memory card, ROM, and DVD (DVD-ROM and DVD-R).

The program can also be supplied by connecting to a homepage of the Internet by using a browser of a client computer, and downloading the computer program itself of the present invention or a compressed file including an automatic installation function from the homepage to a recording medium such as a hard disk. It is also possible to divide the program code forming the program of the present invention into a plurality of files, and download the individual files from different homepages. That is, the present invention includes a WWW server which allows a plurality of users to download a program file for implementing the functional processing of the present invention by a computer.

Furthermore, the program of the present invention can also be encrypted and distributed to users by storing the program in a storage medium such as a CD-ROM. In this case, a user who has cleared predetermined conditions is allowed to download key information for decryption from a homepage across the Internet. The encrypted program can be executed and installed in a computer by using the key information.

Also, besides the functions of the above embodiment are implemented by executing the readout program code by the computer, the functions of the embodiment can be implemented when an OS or the like running on the computer performs part or the whole of actual processing on the basis of instructions by the program.

Furthermore, the functions of the above embodiment can be implemented when the program read out from the recording medium is written in a memory of a function expansion board inserted into the computer or of a function expansion unit connected to the computer, and a CPU or the like of the function expansion board or function expansion unit performs part or the whole of actual processing on the basis of instructions by the program.

[Explanation of Effects]

In the above embodiment, a voice thumbnail is generated by extracting an audio or voice signal interval from an audio or voice signal in audio data, and saved in relation to image data. Therefore, the voice thumbnail can be used simultaneously with the image data.

Also, image data contains an image thumbnail, and a voice thumbnail related to the image data is reproduced when the image data is selected. Accordingly, the user can immediately hear the voice thumbnail when he or she has selected the image data. Consequently, the user can instantaneously recognize the whole image data by the image thumbnail, and can also be assisted by the sound of the voice thumbnail. This allows the user to readily recognize the contents of the data.

The interval extractor extracts a voice signal if it exists in audio data, and extracts an audio signal if no voice signal exists. Therefore, a voice thumbnail can be formed and used even when no voice signal exists in audio data.

Also, the interval extractor extracts a voice signal by searching for a vocalization signal interval. This makes it possible to form a voice thumbnail by using a signal interval having a larger voice information amount, and improve the effect of recognition by voice when the voice thumbnail is reproduced.

The interval extractor searches for a vocalization signal interval, and executes speech rate conversion and signal deletion by which the vocalization signal interval is analyzed and temporally compressed in accordance with its properties. Accordingly, it is possible to temporally compress the vocalization signal interval and increase the voice information amount per unit time of the vocalization signal interval without lowering the voice intelligibility by which the user distinguishes between signals by hearing. As a consequence, the signal can be shortened and the data amount can be reduced while the information amount of the vocalization signal interval is kept saved. When a voice thumbnail is formed by using this vocalization signal interval, the same voice can be transmitted to the user within a shorter time period. Furthermore, the same voice can be transmitted to the user by a smaller information amount. In addition, since speech rate conversion is used in the time compression described above, the signal time compression changes only the speech rate and does not change the voice pitch. Therefore, voice temporally compressed by using speech rate conversion has little unnaturalness.

Also, the vocalization signal interval is analyzed by using one or more of the power, the periodicity, the zero-crossing point of the waveform, and the power ratio of the low frequency to the high frequency of an audio or voice signal. Accordingly, the properties of voice can be analyzed by a method requiring a small processing amount.

Moreover, the interval extractor extracts an audio signal by searching for a sound production signal interval. This makes it possible to form a voice thumbnail by using a signal interval having a larger audio information amount, and improve the effect of recognition by audio when the voice thumbnail is reproduced.

The interval extractor searches for a sound production signal interval, and executes speech rate conversion and signal deletion by which the sound production signal interval is analyzed and temporally compressed in accordance with its properties. Accordingly, it is possible to temporally compress the sound production signal interval and increase the audio information amount per unit time of the sound production signal interval without lowering the voice intelligibility by which the user distinguishes between signals by hearing. As a consequence, the signal can be shortened and the data amount can be reduced while the information amount of the sound production signal interval is kept saved. When a voice thumbnail is formed by using this sound production signal interval, the same voice can be transmitted to the user within a shorter time period. Furthermore, the same voice can be transmitted to the user by a smaller information amount. In addition, since speech rate conversion is used in the time compression described above, the signal time compression changes only the audio rate and does not change the audio pitch. Therefore, audio temporally compressed by using speech rate conversion has little unnaturalness.

Also, the sound production signal interval is analyzed by using the power of the audio signal. Accordingly, the properties of audio can be analyzed by a method requiring a small processing amount.

When image data to which audio data is attached is still image data to which voice memo data is attached, the data can be used as compressed or uncompressed voice memo data and still image data such as JPEG in a digital camera as a representative example of recording/reproduction apparatuses.

Also, when image data to which audio data is attached is talking motion image data, this data can be used as talking motion image data such as MPEG or H.264 in a digital camera or digital video camera.

Furthermore, when image data to which audio data is attached is talking motion image data to which voice memo data is attached, the data cain be used as compressed or uncompressed voice memo data and talking motion image data such as MPEG or H.264 in a digital camera or digital video camera.

This application claims the benefit of Japanese Patent Application No. 2005-137894, filed May 10, 2005, which is hereby incorporated by reference herein in its entirety.

What is claimed is:

1. An apparatus for recording and reproducing movie data to which audio data and reduced image data are attached, comprising:
   an extracting unit adapted to extract one of a specific audio signal or a specific voice signal from audio data;
   an analyzing unit adapted to analyze an audio or voice signal extracted by said extracting unit, wherein the analyzing unit firstly performs a first processing of analyzing whether voice signal exist in the extracted signal, the first processing including at least a processing of analyzing whether the voice signal is vowel or consonant, and if no voice signal exist, secondly performs a second processing of analyzing whether audio signal exist in the extracted signal, the second processing including at least a processing of analyzing whether a frequency of the voice signal exceeds a threshold,
   a generation unit adapted to generate if the voice signal exist in the extracted signal, voice signal, of which amount of information per unit time is increased by a deletion process of at least silent part based on an analyzing result of said analyzing unit, and if no voice signal exist, generate audio signal, of which amount of information per unit time is increased by a deletion process of at least silent part based on an analyzing result of the analyzing unit,
   a recording unit adapted to record the voice signal or audio signal generated by the generation unit in relation to the movie data in a recording medium; and
   a reproducing unit adapted to reproduce the generated audio data when the reduced image data is selected or audio data attached to the movie data when the movie data is selected.

2. The apparatus according to claim 1, further comprising:
   a unit adapted to perform speech rate conversion and signal deletion for temporally compressing the voice signal on the basis of a result of the analysis by said analyzing unit.

3. The apparatus according to claim 2, wherein said analyzing unit analyzes at least one of a power, a periodicity, a zero-crossing point of a waveform, and a power ratio of a low frequency to a high frequency of the audio or voice signal.

4. The apparatus according to claim 1, wherein the movie data to which audio data is attached comprises talking motion image data.

5. The apparatus according to claim 1, wherein the movie data to which audio data is attached comprises talking motion image data to which voice memo data is attached.

6. A method of recording and reproducing movie data to which audio data and reduced image data are attached, the method being performed by a recording and reproducing apparatus, comprising:
   an extraction step of extracting one of a specific audio signal or a specific voice signal from audio data;
   an analyzing step of analyzing an audio or voice signal extracted in said extracting step, wherein the analyzing step firstly performs a first processing of analyzing whether voice signal exist in the extracted signal, the first processing including at least a processing of analyzing whether the voice signal is vowel or consonant, and if no voice signal exist, secondly performs a second processing of analyzing whether audio signal exist in the extracted signal, the second processing including at least a processing of analyzing whether a frequency of the voice signal exceeds a threshold,
   a generation step of generating if the voice signal exist in the extracted signal, voice signal, of which amount of information per unit time is increased by a deletion process of at least silent part based on an analyzing result of said analyzing step, and if no voice signal exist, generate audio signal, of which amount of information per unit time is increased by a deletion process of at least silent part based on an analyzing result of the analyzing step,
   a recording step of recording the voice signal or audio signal generated in said generating step in relation to the movie data in a recording medium; and
   reproducing the generated audio data when the reduced image data is selected or audio data attached to the movie data when the movie data is selected.

7. The method according to claim 6, wherein in the analyzing step, at least one of a power, a periodicity, a zero-crossing point of a waveform, and a power ratio of a low frequency to a high frequency of the voice signal is analyzed.

8. The method according to claim 6, further comprising:
   an analyzing step of analyzing an audio signal in the sound production signal interval; and a step of performing speech rate conversion and signal deletion for temporally compressing the audio signal on the basis of a result of the analysis in the analyzing step.

9. The method according to claim 8, wherein in the analyzing step, a power of the audio signal is analyzed.

10. A program stored on a non-transitory computer-readable medium for causing a computer to execute a recording/reproduction method according to claim 6.

11. A non-transitory computer-readable recording medium storing a program according to claim 10.

* * * * *